(12) United States Patent
Kobayashi et al.

(10) Patent No.: US 8,487,208 B2
(45) Date of Patent: *Jul. 16, 2013

(54) LASER BEAM IRRADIATION APPARATUS AND LASER WORKING MACHINE

(75) Inventors: Yutaka Kobayashi, Ota-ku (JP); Kouichi Nehashi, Ota-ku (JP); Keiji Nomaru, Ota-ku (JP); Yasuomi Kaneuchi, Ota-ku (JP)

(73) Assignee: Disco Corporation, Tokyo (JP)

( * ) Notice: Subject to any disclaimer, the term of this patent is extended or adjusted under 35 U.S.C. 154(b) by 1040 days.

This patent is subject to a terminal disclaimer.

(21) Appl. No.: 11/890,826

(22) Filed: Aug. 8, 2007

(65) Prior Publication Data
US 2008/0037596 A1 Feb. 14, 2008

(30) Foreign Application Priority Data

Aug. 9, 2006 (JP) ................................. 2006-217349

(51) Int. Cl.
*B23K 26/00* (2006.01)

(52) U.S. Cl.
USPC ............ 219/121.61; 219/121.82; 219/121.62; 219/121.66; 219/121.68; 219/121.69; 356/498; 356/502; 359/311; 359/305; 438/7

(58) Field of Classification Search
CPC ............. B23K 26/0635; B23K 26/0853; B23K 26/381; B23K 26/4075; B23K 2201/40
USPC ............ 219/121.61, 121.82, 121.62, 121.66, 219/121.68, 121.69, 121.73, 121.76, 121.8; 359/311, 305; 356/498, 502; 438/7
See application file for complete search history.

(56) References Cited

U.S. PATENT DOCUMENTS

| 3,295,067 | A | * | 12/1966 | Gould | 330/5 |
| 3,388,314 | A | * | 6/1968 | Gould | 250/493.1 |
| 3,399,013 | A | * | 8/1968 | Aas et al. | 359/310 |
| 4,392,476 | A | * | 7/1983 | Gresser et al. | 125/30.01 |
| 4,940,304 | A | * | 7/1990 | Hatori | 385/7 |

(Continued)

FOREIGN PATENT DOCUMENTS

| JP | H04017986 | * | 1/1992 |
| JP | 9-201685 | * | 1/1996 |

(Continued)

OTHER PUBLICATIONS

"Acousto-Optical Effect: Deflectors", 2004, http://web.archive.org/web/20041111090256/http://mt-berlin.com/frames_ao/descriptions/ao_deflectors.htm.*

*Primary Examiner* — Henry Yuen
*Assistant Examiner* — Brett Spurlock
(74) *Attorney, Agent, or Firm* — Greer, Burns & Crain, Ltd.

(57) ABSTRACT

A laser beam irradiation apparatus includes a laser beam oscillation unit including a pulse laser beam oscillator for oscillating a pulse laser beam and a cycle frequency setting unit for setting the cycle frequency, an acousto-optic deflection unit for deflecting the optical axis of the pulse laser beam oscillated from the laser beam oscillation section, and a control unit for controlling the acousto-optic deflection unit. The control unit outputs a driving pulse signal having a predetermined time width including a pulse width of the pulse laser beam oscillated from the pulse laser beam oscillator to the acousto-optic deflection unit based on the cycle frequency setting signal from the cycle frequency setting section.

3 Claims, 10 Drawing Sheets

U.S. PATENT DOCUMENTS

| | | | | |
|---|---|---|---|---|
| 5,065,329 | A * | 11/1991 | Yamazaki et al. | 700/166 |
| 5,253,073 | A * | 10/1993 | Crowley | 348/760 |
| 5,408,482 | A * | 4/1995 | Nagano et al. | 372/31 |
| 5,416,298 | A * | 5/1995 | Robert | 219/121.68 |
| 5,670,067 | A * | 9/1997 | Koide et al. | 219/121.68 |
| 5,748,317 | A * | 5/1998 | Maris et al. | 356/502 |
| 5,960,405 | A * | 9/1999 | Trefethan et al. | 705/7.25 |
| 5,981,903 | A * | 11/1999 | Baumgart et al. | 219/121.77 |
| 6,008,497 | A * | 12/1999 | Mizoguchi et al. | 250/492.1 |
| 6,011,256 | A * | 1/2000 | Takada | 250/235 |
| 6,172,325 | B1 * | 1/2001 | Baird et al. | 219/121.62 |
| 6,172,330 | B1 * | 1/2001 | Yamamoto et al. | 219/121.7 |
| 6,285,002 | B1 * | 9/2001 | Ngoi et al. | 219/121.73 |
| 6,370,171 | B1 * | 4/2002 | Horn et al. | 372/34 |
| 6,649,861 | B2 * | 11/2003 | Duignan | 219/121.6 |
| 6,862,490 | B1 * | 3/2005 | Duignan | 700/121 |
| 7,050,882 | B1 * | 5/2006 | Indou et al. | 700/166 |
| 7,053,390 | B2 * | 5/2006 | Shiraishi | 250/548 |
| 7,176,409 | B2 * | 2/2007 | Gross et al. | 219/121.73 |
| 7,177,057 | B2 * | 2/2007 | Morrow et al. | 359/202.1 |
| 7,505,060 | B2 * | 3/2009 | Amada et al. | 347/241 |
| 7,531,767 | B2 * | 5/2009 | Arai et al. | 219/121.7 |
| 7,569,840 | B2 * | 8/2009 | Morikazu et al. | 250/491.1 |
| 7,667,851 | B2 * | 2/2010 | Dubois et al. | 356/502 |
| 7,675,002 | B2 | 3/2010 | Nomaru et al. | |
| 7,767,550 | B2 * | 8/2010 | Morikazu | 438/460 |
| 8,258,428 | B2 * | 9/2012 | Morikazu | 219/121.7 |
| 2002/0024007 | A1 * | 2/2002 | Engelhardt et al. | 250/234 |
| 2002/0121507 | A1 * | 9/2002 | Vogler et al. | 219/121.71 |
| 2002/0141035 | A1 * | 10/2002 | Davidson et al. | 359/285 |
| 2003/0020923 | A1 * | 1/2003 | Dubois et al. | 356/502 |
| 2003/0201404 | A1 * | 10/2003 | Shiraishi | 250/548 |
| 2004/0129685 | A1 * | 7/2004 | Arai et al. | 219/121.7 |
| 2004/0173590 | A1 * | 9/2004 | Hata et al. | 219/121.77 |
| 2005/0006358 | A1 * | 1/2005 | Shigematsu et al. | 219/121.69 |
| 2005/0088512 | A1 * | 4/2005 | Nomura et al. | 347/260 |
| 2005/0225846 | A1 * | 10/2005 | Nati et al. | 359/341.1 |
| 2005/0270630 | A1 * | 12/2005 | Johnson | 359/305 |
| 2005/0279808 | A1 * | 12/2005 | Johnson | 228/101 |
| 2006/0027540 | A1 * | 2/2006 | Bruland et al. | 219/121.61 |
| 2006/0028710 | A1 * | 2/2006 | Johnson et al. | 359/311 |
| 2006/0096956 | A1 * | 5/2006 | Indou et al. | 219/121.61 |
| 2006/0189034 | A1 * | 8/2006 | Tanabe et al. | 438/117 |
| 2006/0201920 | A1 * | 9/2006 | Morikazu et al. | 219/121.82 |
| 2007/0075059 | A1 * | 4/2007 | Arai | 219/121.71 |
| 2007/0138156 | A1 * | 6/2007 | Nomaru et al. | 219/121.73 |
| 2008/0031291 | A1 * | 2/2008 | Kobayashi et al. | 372/29.012 |
| 2008/0037596 | A1 * | 2/2008 | Kobayashi et al. | 372/9 |
| 2009/0230103 | A1 * | 9/2009 | Nomaru et al. | 219/121.71 |

FOREIGN PATENT DOCUMENTS

| | | |
|---|---|---|
| JP | 2003-163323 | 6/2003 |
| JP | 2006-247674 | 9/2006 |
| WO | WO 0064621 A1 * | 11/2000 |

* cited by examiner

LASER BEAM IRRADIATION APPARATUS AND LASER WORKING MACHINE

BACKGROUND OF THE INVENTION

1. Field of the Invention

The present invention relates to a laser beam irradiation apparatus configured to irradiate a laser beam on a work and a laser working machine which includes the laser beam irradiation apparatus.

2. Description of the Related Art

In a semiconductor device fabrication process, a plurality of regions are defined by division plan lines called streets arranged in a grid-like fashion on the surface of a semiconductor wafer having a substantial disk shape, and devices such as an IC, an LSI, and so forth are formed on the sectioned regions. Then, the semiconductor wafer is cut along the division plan lines so that the regions in which the devices are formed are divided to fabricate individual semiconductor chips. In order to implement downsizing and higher functionalization of an apparatus, a module structure in which a plurality of semiconductor chips are laminated and electrodes of the laminated semiconductor chips are connected to each other has been placed into practical use. As disclosed, for example, in Japanese Patent Laid-open No. 2003-163323, the module structure is configured such that a through-hole (via hole) is formed at a portion of a semiconductor wafer at which an electrode is formed and a conductive material to be connected to the electrode such as aluminum is filled in the through-hole (via hole).

The through-hole (via hole) provided in the semiconductor wafer described above is formed by means of a drill. However, since the diameter of the through-hole (via hole) provided in the semiconductor wafer is as small as 100 to 300 μm, there is a problem that, where a drill is used to form a hole, the productivity is low. In order to eliminate the problem described above, the assignee of the present application has proposed a laser working apparatus which can effectively form a fine hole in a work such as a semiconductor wafer or the like in Japanese Patent Application No. 2005-64867. The laser working apparatus includes working feeding amount detection means configured to detect a relative working feeding amount between a chuck table for holding a work and laser beam irradiation means, and storage means configured to store X and Y coordinate values of a pore formed on the work. The laser working apparatus further includes control means configured to control the laser beam irradiation means based on the X and Y coordinate values of the fine hole stored in the storage means and a detection signal from the working feeding amount detection means. The laser working apparatus is configured such that a one-pulse laser beam is irradiated if the X and Y coordinate values of the fine hole formed in the work indicate a position just below a condenser of the laser beam irradiation means.

However, while it is necessary, in order to form a fine hole in a work, for a pulse laser beam to be irradiated on the same portion by a plural number of times, where the laser working apparatus described above is used, the movement of the work must be performed by a plural number of times. Therefore, the laser working apparatus is not necessarily satisfactory from a point of view of the productivity. Further, it is preferable to form a plurality of laser working grooves on a work only if working feeding is performed without performing indexing feeding of the work in an indexing feeding direction (Y-axis direction) orthogonal to a working feeding direction (X-axis direction).

In order to satisfy such a demand as just described, the assignee of the present application has proposed a laser working apparatus in Japanese Patent Application No. 2005-362236. The laser working apparatus includes laser beam irradiation means having acousto-optic deflection means in which an acousto-optic device is used, and deflects a laser beam oscillated by laser beam oscillation means when it passes the acousto-optic device so that the laser beam is irradiated at the same working position while performing working feeding of a work.

However, the acousto-optic deflection means is formed from an acousto-optic device for deflecting a laser beam oscillated from the laser beam oscillation means, a RF oscillator for applying a RF (radio frequency) to the acousto-optic device, a deflection angle adjustment means for adjusting the frequency of the RF to be outputted from the RF oscillator and an output adjustment means for adjusting the amplitude of the RF to be generated by the RF oscillator. Therefore, there is a problem that, if the RF is continuously applied to the acousto-optic device, then since thermal distortion appears on the acousto-optic device, an error occurs with the deflection angle of the laser beam and an output of the laser beam becomes non-uniform, resulting in failure in high accuracy working.

SUMMARY OF THE INVENTION

Therefore, it is an object of the present invention to provide a laser beam irradiation apparatus and a laser working machine which can suppress thermal distortion of an acousto-optic device which forms an acousto-optic deflection means to thereby achieve high accuracy working.

In accordance with an aspect of the present invention, there is provided a laser beam irradiation apparatus, including a laser beam oscillation means including a pulse laser beam oscillator configured to oscillate a pulse laser beam and a cycle frequency setting means for setting the cycle frequency of the pulse laser beam to be oscillated from the pulse laser beam oscillator, an acousto-optic deflection means including an acousto-optic device configured to deflect the pulse laser beam oscillated from the laser beam oscillation means, a RF oscillator configured to apply a RF to the acousto-optic device, a deflection angle adjustment means for adjusting the frequency of the RF to be outputted from the RF oscillator and an output adjustment means for adjusting the amplitude of the RF to be generated by the RF oscillator, a control means for controlling the deflection angle adjustment means and the output adjustment means, and a condenser configured to condense the laser beam deflected by the acousto-optic deflection means, the control means outputting a driving pulse signal having a predetermined time width including a pulse width of the pulse laser beam oscillated from the pulse laser beam oscillator to the deflection angle adjustment means and the output adjustment means based on the cycle frequency setting signal from the cycle frequency setting means.

With the configuration described above, since the driving pulse signal having the predetermined time width including the pulse width of the pulse laser beam oscillated from the pulse laser beam oscillator is outputted to the deflection angle adjustment means and the output adjustment means, the time within which the RF is applied to the first and second acousto-optic devices with respect to the period of the pulse laser beam oscillated from the pulse laser beam oscillator becomes very short. Consequently, thermal distortion appearing in the acousto-optic device is suppressed. Accordingly, with the laser beam irradiation apparatus according to the present invention, the disadvantages arising from thermal distortion of the acousto-optic device are eliminated and high accuracy working can be implemented.

Preferably, the cycle frequency setting means includes an excitation trigger transmitter configured to output an excitation trigger to the pulse laser beam oscillator and an oscillation trigger transmitter configured to output an oscillation trigger to the pulse laser beam oscillator, and the control means sets a timing at which the driving pulse signal is to be outputted with reference to the excitation trigger outputted from the excitation trigger transmitter.

Preferably, the acousto-optic deflection means is formed from first and second acousto-optic deflection means configured to deflect the laser beam oscillated from the laser beam oscillation means to directions orthogonal to each other.

In accordance with another aspect of the present invention, there is provided a laser working machine, including a chuck table configured to hold a work, a laser beam irradiation means for irradiating a laser beam on the work held by the chuck table, a working feeding means for relatively moving the chuck table and the laser beam irradiation means in a working feeding direction (X-axis direction), and an indexing feeding means for relatively moving the chuck table and the laser beam irradiation means in an indexing feeding direction (Y-axis direction) orthogonal to the working feeding direction (X-axis direction), the laser beam irradiation means being formed from the laser beam irradiation apparatus described above.

The above and other objects, features and advantages of the present invention and the manner of realizing them will become more apparent, and the invention itself will best be understood, from a study of the following description and the appended claims with reference to the attached drawings showing some preferred embodiments of the invention.

DETAILED DESCRIPTION OF THE PREFERRED EMBODIMENTS

Figure 1:
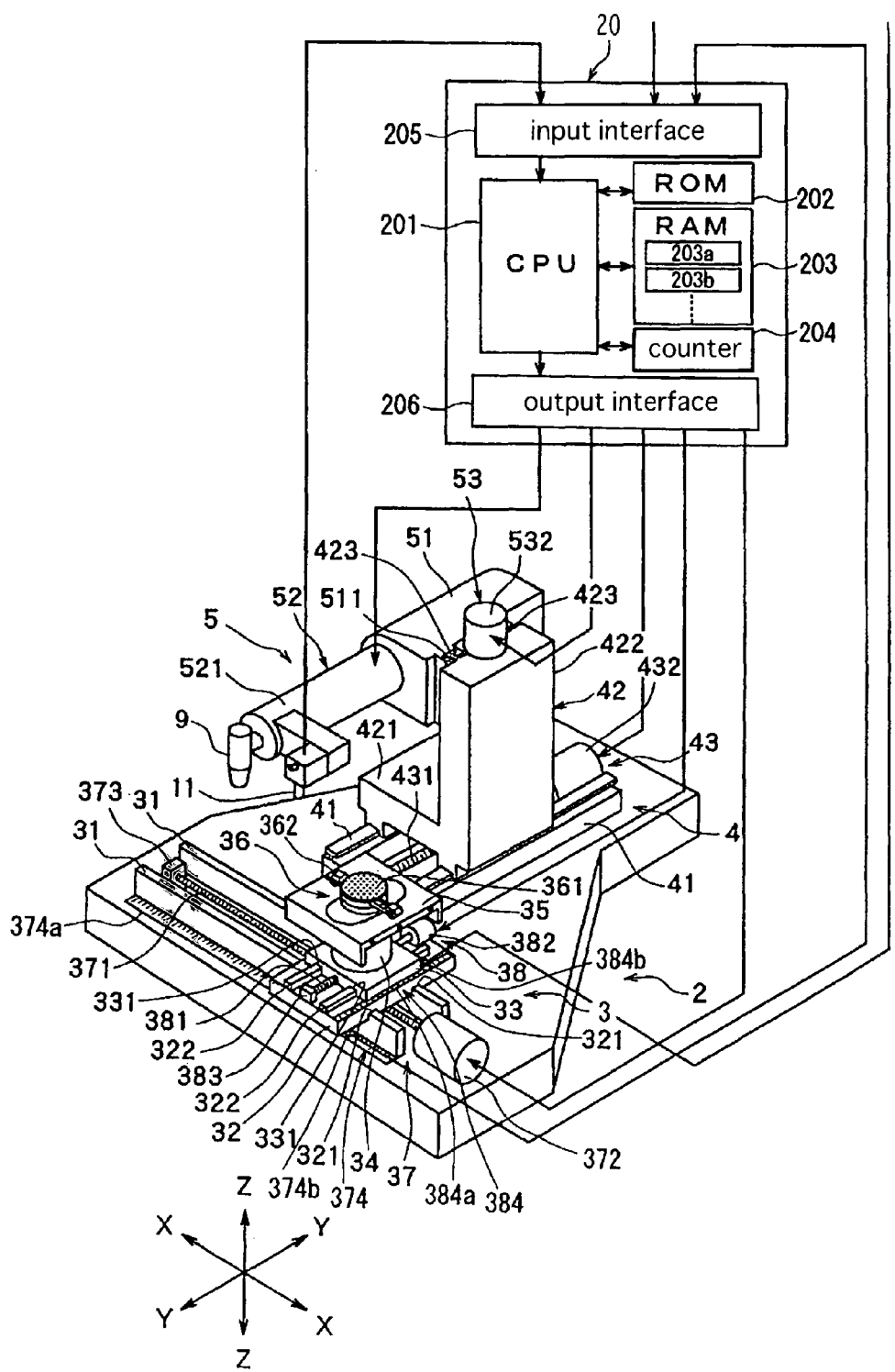
FIG. 1 is a perspective view of a laser working machine configured in accordance with the present invention.

In the following, preferred embodiments of a laser beam irradiation apparatus and a laser working machine configured in accordance with the present invention are described in more detail with reference to the accompanying drawings. FIG. 1 is a perspective view showing a laser working machine configured in accordance with the present invention. The laser working machine shown in FIG. 1 includes a stationary platform 2, and a chuck table mechanism 3 disposed for movement in a working feeding direction (X-axis direction) indicated by an arrow mark X on the stationary platform 2 and configured to hold a work. The laser working machine further includes a laser beam irradiation unit supporting mechanism 4 disposed for movement in an indexing feeding direction (Y-axis direction) indicated by an arrow mark Y orthogonal to the direction (X-axis direction) indicated by the arrow mark X on the stationary platform 2. The laser working machine further includes a laser beam irradiation unit 5 disposed for movement in a direction (Z-axis direction) indicated by an arrow mark Z on the laser beam unit supporting mechanism 4.

The chuck table mechanism 3 includes a pair of guide rails 31 disposed in parallel to each other along the working feeding direction (X-axis direction) indicated by the arrow mark X on the stationary platform 2, and a first sliding block 32 disposed for movement in the working feeding direction (X-axis direction) indicated by the arrow mark X on the guide rails 31. The chuck table mechanism 3 further includes a second sliding block 33 disposed for movement in the indexing feeding direction (Y-axis direction) indicated by the arrow mark Y on the first sliding block 32, and a cover table 35 supported on the second sliding block 33 by a cylindrical member 34. The chuck table mechanism 3 further includes a chuck table 36 as work supporting means. The chuck table 36 includes an adsorption chuck 361 formed from a porous material and supports, for example, a disk-shaped semiconductor wafer which is a work on the adsorption chuck 361 by sucking means not shown. The chuck table configured in such a manner as described above is rotated by a step motor not shown disposed in the cylindrical member 34. It is to be noted that a clamp 362 for fixing an annular frame hereinafter described is disposed on the chuck table 36.

A pair of guide grooves 321 are provided on a bottom face of the first sliding block 32 so as to fit with the guide rails 31 described above, and a pair of guide rails 322 are formed on the top face of the first sliding block 32 and extend in parallel to each other along the indexing feeding direction (Y-axis direction) indicated by the arrow mark Y. The first sliding block 32 having such a configuration as described above is mounted for movement in the working feeding direction (X-axis direction) indicated by the arrow mark X along the paired guide rails 31 with the guide grooves 321 thereof fitted with the guide rails 31. The chuck table mechanism 3 in the embodiment shown in FIG. 1 includes working feeding means 37 for moving the first sliding block 32 in the working feeding direction (X-axis direction) indicated by the arrow mark X along the guide rails 31.

The working feeding means 37 includes driving sources such as an external thread rod 371 disposed in parallel between the guide rails 31, a step motor 372 for driving the external thread rod 371 to rotate and so forth. The external thread rod 371 is supported at an end thereof for rotation on a bearing block 373 fixed to the stationary platform 2 described above and is connected at the other end thereof for motion transmission to an output power shaft of the step motor 372. It is to be noted that the external thread rod 371 is screwed in a through internal thread hole formed in an internal thread block not shown provided in a projecting manner on the bottom face at a central portion of the first sliding block 32. Accordingly, if the external thread rod 371 is driven to rotate forwardly and reversely by the step motor 372, then the first sliding block 32 is moved in the working feeding direction (X-axis direction) indicated by the arrow mark X along the guide rails 31.

The laser working machine in the embodiment shown in FIG. 1 includes working feeding amount detection means 374 configured to detect a working feeding amount of the chuck table 36. The working feeding amount detection means 374 includes a linear scale 374a disposed along the guide rail 31 and a reading head 374b disposed on the first sliding block 32 for movement along the linear scale 374a together with the first sliding block 32. The reading head 374b of the working feeding amount detection means 374 in the embodiment shown in FIG. 1 sends a pulse signal of 1 pulse to control means hereinafter described by every 1 μm. The control means hereinafter described counts the inputted pulse signal to detect a working feeding amount of the chuck table 36.

It is to be noted that, where the step motor 372 is used as a driving source for the working feeding means 37, the working feeding amount of the chuck table 36 can be detected also by counting a driving pulse of the control means hereinafter described which outputs the driving signal to the step motor 372. On the other hand, where a servo motor is used alternatively as a driving source for the working feeding means 37, the working feeding amount of the chuck table 36 can be detected also by sending a pulse signal outputted from a rotary encoder which detects the number of rotations of the servo motor to the control means hereinafter described so that the control means counts the pulse signal inputted from the control means.

A pair of guide grooves 331 are provided on the bottom face of the second sliding block 33 so as to individually fit with the guide rails 322 provided on the top face of the first sliding block 32. The guide grooves 331 and the guide rails 322 fit with each other such that the second sliding block 33 can move in the indexing feeding direction (Y-axis direction) indicated by the arrow mark Y. The chuck table mechanism 3 in the embodiment shown in FIG. 1 includes first indexing feeding means 38 configured to move the second sliding block 33 in the indexing feeding direction (Y-axis direction) indicated by the arrow mark Y along the guide rails 322 provided on the first sliding block 32.

The first indexing feeding means 38 includes driving sources such as an external thread rod 381 disposed in parallel to each other between the guide rails 322, a step motor 382 for driving the external thread rod 381 to rotate, and so forth. The external thread rod 381 is supported at an end thereof for rotation on a bearing block 383 fixed to the top face of the first sliding block 32 and is connected at the other end thereof for motion transmission to an output power shaft of the step motor 382. It is to be noted that the external thread rod 381 is screwed in a through internal thread hole formed in an internal thread block not shown provided in a projecting manner on the bottom face at a central portion of the second sliding block 33. Accordingly, if the external thread rod 381 is driven to rotate forwardly and reversely by the step motor 382, then the second sliding block 33 is moved in the indexing feeding direction (Y-axis direction) indicated by the arrow mark Y along the guide rails 322.

The laser working machine in the embodiment shown in FIG. 1 includes indexing feeding amount detection means 384 for detecting an indexing and working feeding amount of the second sliding block 33. The indexing feeding amount detection means 384 includes a linear scale 384a disposed along the guide rail 322 and a reading head 384b disposed on the second sliding block 33 for movement along the linear scale 384a together with the second sliding block 33. The reading head 384a of the feeding amount detection means 384 sends a pulse signal of 1 pulse to the control means hereinafter described for every 1 μm in the embodiment in FIG. 1. Then, the control means hereinafter described counts the inputted pulse signal to detect an indexing feeding amount of the chuck table 36.

It is to be noted that, where the step motor 382 is used as a driving source for the first indexing feeding means 38, the indexing feeding amount of the chuck table 36 can be detected also by counting a driving pulse of the control means hereinafter described which outputs the driving signal to the step motor 382. On the other hand, where a servo motor is used as a driving source for the first indexing feeding means 38, the indexing feeding amount of the chuck table 36 can be detected also by sending a pulse signal outputted from a rotary encoder which detects the number of rotations of the servo motor to the control means hereinafter described so that the control means counts the pulse signal inputted thereto.

The laser beam irradiation unit supporting mechanism 4 includes a pair of guide rails 41 disposed in parallel to each other along the indexing feeding direction (Y-axis direction) indicated by the arrow mark Y on the stationary platform 2 and a movable supporting platform 42 disposed for movement in the direction indicated by the arrow mark Y on the guide rails 41. The movable supporting platform 42 includes moving supporting means 421 disposed for movement on the guide rails 41 and mounting means 422 mounted on the moving supporting means 421. A pair of guide rails 423 are provided in parallel to each other on one side face of the mounting means 422 and extends in the direction (Z-axis direction) indicated by the arrow mark Z. The laser beam irradiation unit supporting mechanism 4 in the embodiment shown in FIG. 1 includes second indexing feeding means 43 for moving the movable supporting platform 42 in the indexing feeding direction (Y-axis direction) indicated by the arrow mark Y along the paired guide rails 41.

The second indexing feeding means 43 includes driving sources such as an external thread rod 431 disposed in parallel between the paired guide rails 41, a step motor 432 for driving the external thread rod 431 to rotate, and so forth. The external thread rod 431 is supported at an end thereof for rotation on a bearing block not shown fixed to the stationary platform 2 and is connected at the other end thereof for motion transmission to an output power shaft of the step motor 432. It is to be noted that the external thread rod 431 is screwed in an internal thread hole formed in an internal thread block not shown provided in a projecting manner on the bottom face at a central portion of the moving supporting means 421 which forms the movable supporting platform 42. Therefore, if the external thread rod 431 is driven to rotate forwardly and reversely by the step motor 432, then the movable supporting platform 42 is moved in the indexing feeding direction (Y-axis direction) indicated by the arrow mark Y along the guide rails 41.

The laser beam irradiation unit 5 in the embodiment shown in FIG. 1 includes a unit holder 51 and a laser beam irradiation apparatus 52 mounted on the unit holder 51. The unit holder 51 has a pair of guide grooves 511 which fit for sliding motion with the guide rails 423 provided on the mounting means 422 and is supported for movement in the direction (Z-axis direction) indicated by the arrow mark Z with the guide grooves 511 thereof fit the guide rails 423.

The laser beam irradiation unit 5 in the embodiment shown in FIG. 1 includes moving means 53 for moving the unit holder 51 in the direction (Z-axis direction) indicated by the arrow mark Z along the guide rails 423. The moving means 53 includes driving sources such as an external thread rod (not shown) disposed between the guide rails 423, a step motor 532 for driving the external thread rod to rotate, and so forth. In the moving means 53, the step motor 532 drives the external thread rod not shown to rotate forwardly and reversely to the unit holder 51 and the laser beam irradiation apparatus 52 in the direction (Z-axis direction) indicated by the arrow mark Z along the guide rails 423. It is to be noted that, in the embodiment shown in FIG. 1, when the step motor 532 rotates forwardly, the laser beam irradiation apparatus 52 moves upwardly, but when the step motor 532 rotates reversely, the laser beam irradiation apparatus 52 moves downwardly.

Figure 2:
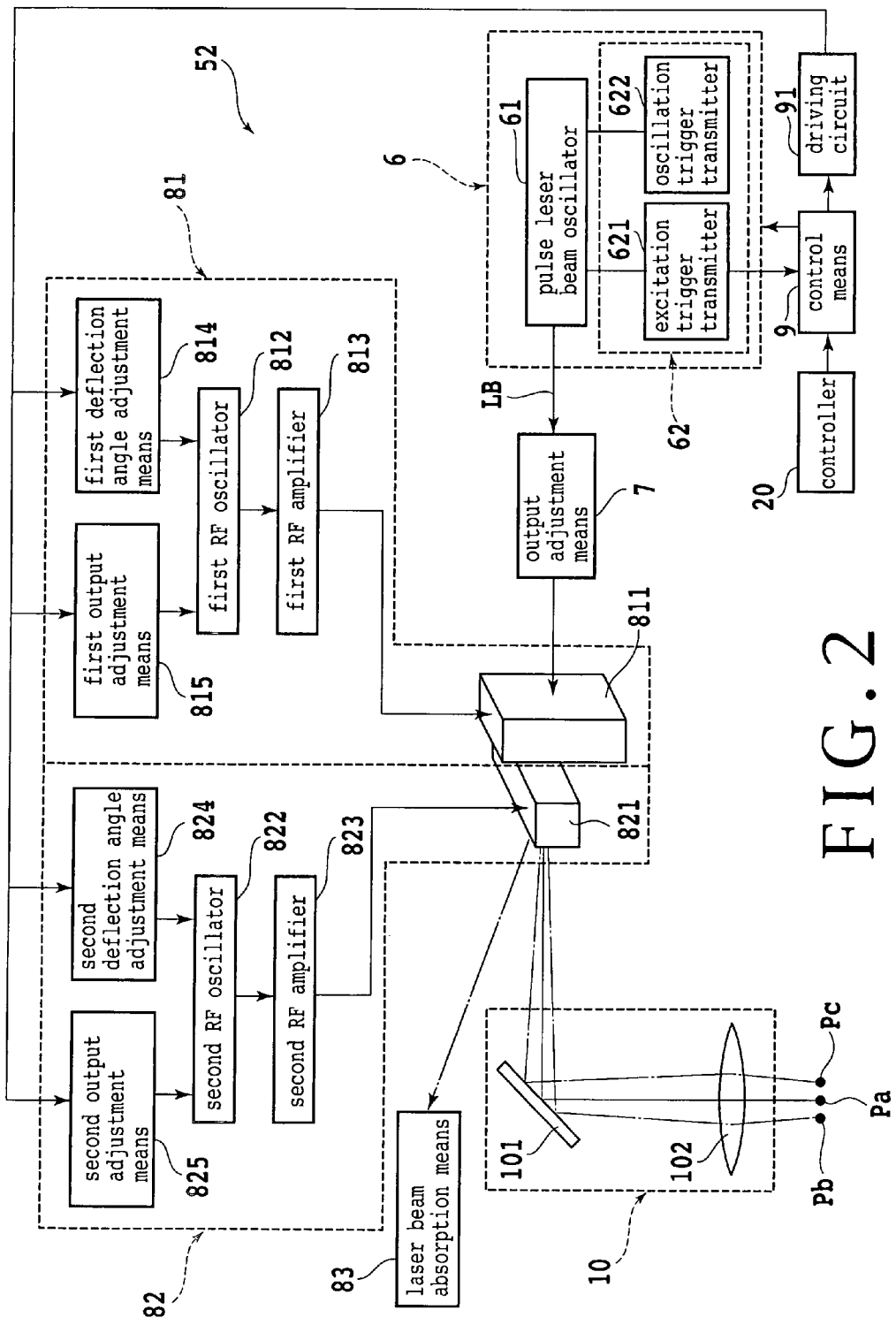
FIG. 2 is a block diagram showing a configuration of a laser beam irradiation apparatus installed in the laser working machine shown in FIG. 1.

The laser beam irradiation apparatus 52 includes a cylindrical casing 521 arranged substantially horizontally, a pulse laser beam oscillation means 6 disposed in the casing 521 as seen in FIG. 2, and output adjustment means 7. The laser beam irradiation apparatus 52 further includes a first acousto-optic deflection means 81 for deflecting a laser beam oscillated from the pulse laser beam oscillation means 6 to the working feeding direction (X-axis direction). The laser beam irradiation apparatus 52 further includes a second acousto-optic deflection means 82 for deflecting the laser beam oscillated by the laser beam oscillation means 6 to the indexing feeding direction (Y-axis direction) and control means 9 for controlling the first and second acousto-optic deflection means 81 and 82. The laser beam irradiation apparatus 52 further includes a condenser 10 for irradiating a pulse laser beam passing through the first and second acousto-optic deflection means 81 and 82 on the work held on the chuck table 36.

The pulse laser beam oscillation section 6 includes a pulse laser beam oscillator 61 formed from a YAG laser oscillator or a YVO4 laser oscillator and a cycle frequency setting section 62 provided for the pulse laser beam oscillator 61. The pulse laser beam oscillator 61 oscillates a pulse laser beam (LB) having a predetermined frequency set by the cycle frequency setting section 62. The cycle frequency setting section 62 includes an excitation trigger transmitter 621 and an oscillation trigger transmitter 622. In the pulse laser beam oscillation section 6 configured in such a manner as described above, the pulse laser beam oscillator 61 starts excitation based on the excitation trigger outputted after every predetermined cycle from the excitation trigger transmitter 621 and oscillates a pulse laser beam based on an oscillation trigger outputted after every predetermined cycle from the oscillation trigger transmitter 622. The output adjustment section 7 adjusts the output power of the pulse laser beam LB oscillated from the pulse laser beam oscillation section 6 to predetermined output power.

The first acousto-optic deflection means 81 includes a first acousto-optic device 811 for deflecting the laser beam oscillated from the laser beam oscillation means 6 to the working feeding direction (X-axis direction). The first acousto-optic deflection means 81 further includes a first RF oscillator 812 for generating a RF (radio frequency) to be applied to the first acousto-optic device 811, and a first RF amplifier 813 for amplifying the power of the RF generated by the first RF oscillator 812 applying the amplified power to the first acousto-optic device 811. The first acousto-optic deflection means 81 further includes first deflection angle adjustment means 814 for adjusting the frequency of the RF to be generated by the first RF oscillator 812, and first output adjustment means 815 for adjusting the amplitude of the RF to be generated by the first RF oscillator 812. The first acousto-optic device 811 can adjust the deflection angle of the laser beam in response to the frequency of the applied RF and can adjust the output power of the laser beam in response to the amplitude of the applied RF. It is to be noted that the first deflection angle adjustment means 814 and the first output adjustment means 815 are controlled by the control means 9 hereinafter described.

The second acousto-optic deflection means 82 includes a second acousto-optic device 821 for deflecting the laser beam oscillated from the laser beam oscillation means 6 to the indexing feeding direction (Y-axis direction: a vertical direction with respect to the plane on FIG. 2) orthogonal to the working feeding direction (X-axis direction). The second acousto-optic deflection means 82 includes further includes a second RF oscillator 822 for generating a RF to be applied to the second acousto-optic device 821, and a second RF amplifier 823 for amplifying the power of the RF generated by the second RF oscillator 822 and applying the amplifier power to the second acousto-optic device 821. The second acousto-optic deflection means 82 further includes second deflection angle adjustment means 824 for adjusting the frequency of the RF to be generated by the second RF oscillator 822, and second output adjustment means 825 for adjusting the amplitude of the RF to be generated by the second RF oscillator 822. The second acousto-optic device 821 can adjust the deflection angle of the laser beam in response to the frequency of the applied RF and can adjust the output power of the laser beam in response to the amplitude of the applied RF. It is to be noted that the second deflection angle adjustment means 824 and the second output adjustment means 825 are controlled by the control means 9 hereinafter described.

The laser beam irradiation apparatus 52 in the embodiment shown in FIG. 1 includes laser beam absorption means 83 for absorbing, as indicated by a broken line in FIG. 2, the laser beam deflected by the first acousto-optic device 811 where the RF having a predetermined frequency is applied to the first acousto-optic device 811.

The control means 9 outputs a driving pulse signal corresponding to a pulse of the pulse laser beam oscillated from the pulse laser beam oscillator 621 to a driving circuit 91 based on an excitation trigger outputted from the excitation trigger transmitter 621 which is a cycle frequency setting signal from the cycle frequency setting means 62 of the pulse laser beam oscillation means 6. The driving circuit 91 applies a voltage corresponding to the driving pulse signal from the control means 9 to the first deflection angle adjustment means 814 and the first output adjustment means 815 of the first acousto-optic deflection means 81 and the second deflection angle adjustment means 824 and the second output adjustment means 825 of the second acousto-optic deflection means 82.

Figure 3:
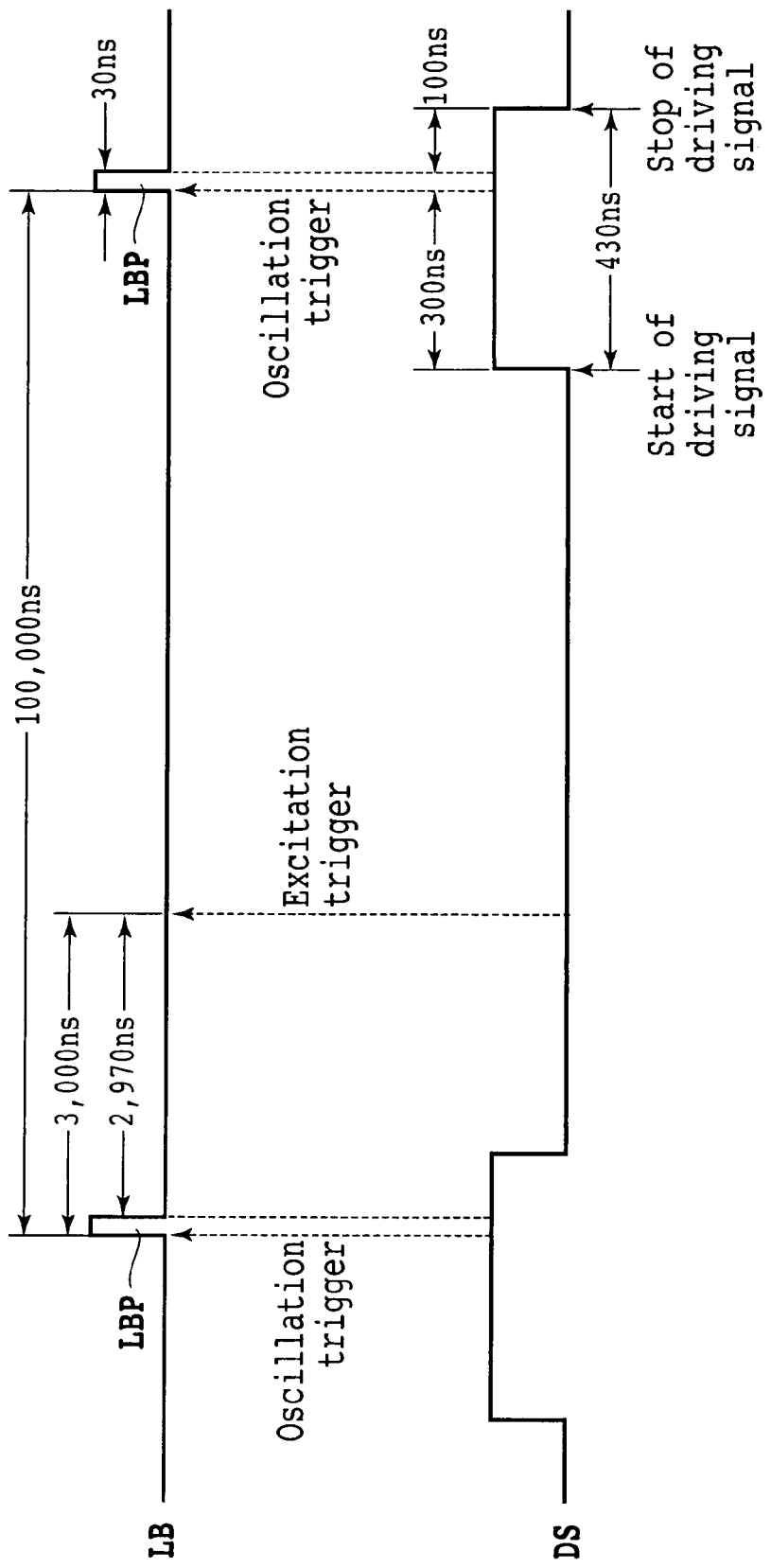
FIG. 3 is an explanatory view illustrating a relationship between a pulse laser beam oscillated from a pulse laser beam oscillation means of the laser beam irradiation apparatus shown in FIG. 2 and a driving pulse signal of a voltage to be applied to an acousto-optic deflection means.

Here, the driving pulse signal outputted from the control means 9 to the driving circuit 91 is described with reference to FIGS. 2 and 3. It is to be noted that the frequency set by the cycle frequency setting means 62 of the pulse laser beam oscillation means 6 is assumed to be, for example, 10 kHz. Accordingly, the pulse (LBP) distance of the pulse laser beam (LB) to be oscillated from the pulse laser beam oscillator 61 is 100,000 ns as seen in FIG. 3. Then, in order to oscillate the pulse laser beam (LB) illustrated in FIG. 3, an excitation trigger is outputted from the excitation trigger transmitter 621 to the pulse laser beam oscillator 61 before a pulse is oscillated after a preceding pulse is oscillated.

If it is assumed that the timing at which an excitation trigger is to be outputted is set, for example, to 3,000 ns after an oscillation trigger is outputted from the oscillation trigger transmitter 622 to the pulse laser beam oscillator 61, then the pulse (LBP) width of the pulse laser beam (LB) to be oscillated from the pulse laser beam oscillator 61 is, for example, 30 ns. Accordingly, the excitation trigger is to be outputted after 2,970 ns after the pulse laser beam (LB) is oscillated by one pulse from the pulse laser beam oscillator 61. In such setting as described above, an excitation trigger outputted from the excitation trigger transmitter 621 is sent also to the control means 9 which controls the first deflection angle adjustment means 814 and the first output adjustment means 815 of the first acousto-optic deflection means 81 and the second deflection angle adjustment means 824 and the second output adjustment means 825 of the second acousto-optic deflection means 82.

The driving pulse signal (DS) for driving the first deflection angle adjustment means 814 and the first output adjustment means 815 of the first acousto-optic deflection means 81 and the second deflection angle adjustment means 824 and the second output adjustment means 825 of the second acousto-optic deflection means 82 is necessitated to be outputted for a predetermined period of time including the pulse width of the pulse (LBP) of the pulse laser beam (LB) oscillated from the pulse laser beam oscillator 61. For example, if it is assumed that the point of time of starting of the driving pulse signal (DS) is set to 300 ns before an oscillation trigger is to be outputted and the point of time of ending of the driving pulse signal (DS) is set to 10 ns after the pulse (LBP) of the pulse laser beam (LB) ends, then the control means 9 starts the driving pulse signal (DS) 96,700 ns after the excitation trigger is oscillated, and outputs the driving pulse signal (DS) for 430 ns. By outputting the driving pulse signal (DS) from the control means 9 in such a manner as just described, for 430 ns including time within which the pulse (LBP) of the pulse laser beam (LB) is oscillated, the first deflection angle adjustment means 814 and the first output adjustment means 815 of the first acousto-optic deflection means 81 and the second deflection angle adjustment means 824 and the second output adjustment means 825 of the second acousto-optic deflection means 82 can be controlled.

Since, as described above, one cycle of the driving pulse signal (DS) is 430 ns and one cycle of the pulse laser beam (LB) is 100,000 ns, the first deflection angle adjustment means 814 and the first output adjustment means 815 of the first acousto-optic deflection means 81 and the second deflection angle adjustment means 824 and the second output adjustment means 825 of the second acousto-optic deflection means 82 may be driven by 0.43% with respect to irradiation time of the pulse laser beam (LB). Accordingly, since the time for which the RF is to be applied to the first and second acousto-optic devices 811 and 821 with respect to the irradiation time of the pulse laser beam (LB) may be very short, thermal distortion which may appear on the first and second acousto-optic devices 811 and 821 is suppressed.

Description of the embodiment is continued referring back to FIG. 2. The condenser 10 is mounted at the tip end of the casing 521 and includes a direction changing mirror 101 for changing the direction of the pulse laser beam deflected by the first and second acousto-optic deflection means 81 and 82 toward a downward direction and a condensing lens 102 for condensing the laser beam whose direction is changed by the direction changing mirror 101.

The pulse laser beam irradiation apparatus 52 in the embodiment shown in FIG. 1 is configured in such a manner as described above, and operation thereof is described below with reference to FIG. 2. For example, if a voltage of 5 V is applied from the driving circuit 91 to the first deflection angle adjustment means 814 of the first acousto-optic deflection means 81 and a RF having a frequency corresponding to 5 V is applied to the first acousto-optic device 811, then a pulse laser beam oscillated from the pulse laser beam oscillation means 6 is deflected as indicated by a solid line in FIG. 2. Consequently, the pulse laser beam is condensed at a condensing point Pa. On the other hand, for example, if another voltage of 10 V is applied from the driving circuit 91 to the first deflection angle adjustment means 814 and a RF having the frequency corresponding to 10 V is applied to the first acousto-optic device 811, then the pulse laser beam oscillated from the pulse laser beam oscillation means 6 is deflected as indicated by an alternate long and short dash line in FIG. 2. Consequently, the pulse laser beam is condensed at another condensing point Pb displaced leftwardly in the working feeding direction (X-axis direction) by a predetermined amount in FIG. 2 from the condensing point Pa.

In contrast, for example, if a further voltage of 0 V is applied from the driving circuit 91 to the first deflection angle adjustment means 814 and a RF having the frequency corresponding to 0 V is applied to the first acousto-optic device 811, then the pulse laser beam oscillated from the pulse laser beam oscillation means 6 is deflected as indicated by an alternate long and two short dashes line in FIG. 2. Consequently, the pulse laser beam is condensed at a further condensing point Pc displaced to the right in the working feeding direction (X-axis direction) by a predetermined amount in FIG. 2 from the condensing point Pa. On other hand, for example, if a still further voltage of 15 V is applied from the driving circuit 91 to the first deflection angle adjustment means 814 of the first acousto-optic deflection means 81 and a RF having the frequency corresponding to 15 V is applied to the first acousto-optic device 811, then the pulse laser beam oscillated from the pulse laser beam oscillation means 6 is guided to the laser beam absorption means 83 as indicated by a broken line in FIG. 2. In this manner, the laser beam is deflected by the first acousto-optic device 811 to the working feeding direction (X-axis direction) in response to the voltage applied to the first deflection angle adjustment means 814.

It is to be noted that, also in the second acousto-optic deflection means 82, if the voltage to be applied to the second deflection angle adjustment means 824 and the frequency of a RF to be applied to the second acousto-optic device 821 is adjusted similarly as in the first acousto-optic deflection means 81, then the pulse laser beam oscillated from the pulse laser beam oscillation means 6 can be deflected to the indexing feeding direction (Y-axis direction: a vertical direction with respect to the plane on FIG. 2) orthogonal to the working feeding direction (X-axis direction).

Description is continued referring back to FIG. 1. The laser working machine in the embodiment shown in FIG. 1 includes an image pickup means 11 disposed at a front end portion of the casing 521 for detecting a working region for which laser working is to be performed by the laser beam irradiation apparatus 52. The image pickup means 11 includes not only a normal image pickup device (CCD) for performing image pickup utilizing a visible beam but also an infrared ray irradiation means for irradiating an infrared ray on a work, an optical system for catching the infrared ray irradiated from the infrared ray irradiation means, an image pickup device (infrared ray CCD) for outputting an electric signal corresponding to the infrared ray caught by the optical system and so forth, and sends a signal of a picked up image to the control means hereinafter described.

Description is continued with reference to FIG. 1. The laser working machine in the embodiment shown in FIG. 1 includes a controller 20. The controller 20 is formed from a computer and includes a central processing unit (CPU) 201 for performing an arithmetic operation process in accordance with a control program, a read only memory (ROM) 202 for storing the control program and so forth, a readable and writable random access memory (RAM) 203 for storing data of design values of a work hereinafter described, a calculation result and so forth, a counter 204, an input interface 205, and an output interface 206. Detection signals from the working feeding amount detection means 374, indexing feeding amount detection means 384, image pickup means 11 and so forth are inputted to the input interface 205 of the controller 20. Then, a control signal is outputted from the output interface 206 of the controller 20 to the pulse motors 372, 382, 432 and 532, pulse laser beam oscillation means 6, control means 9 and so forth. It is to be noted that the random access memory (RAM) 203 has a first storage region 203a for storing data of design values of a work hereinafter described and other storage regions.

Figure 4:
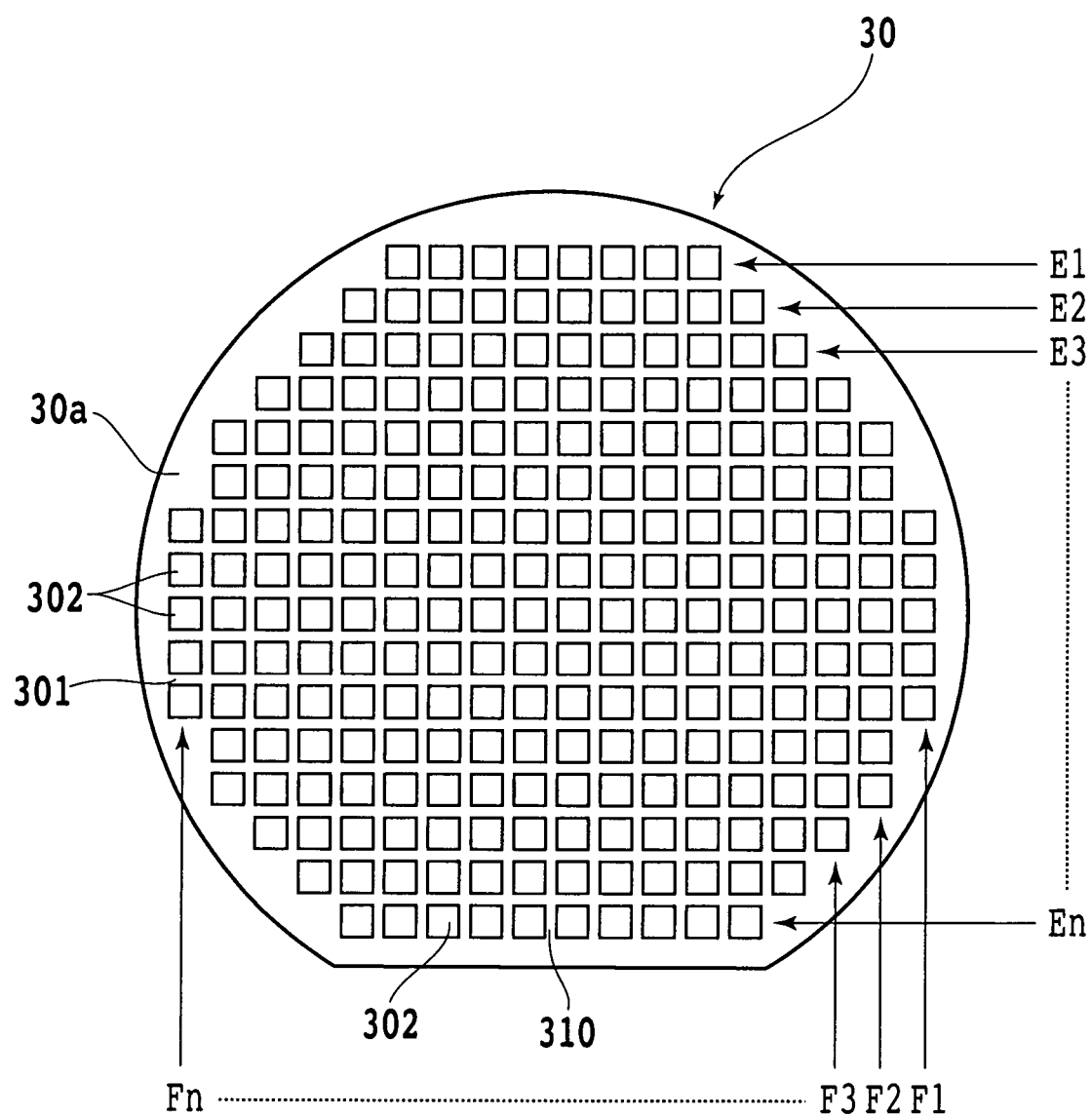
FIG. 4 is a top plan view of a semiconductor wafer as a work.
Figure 5:
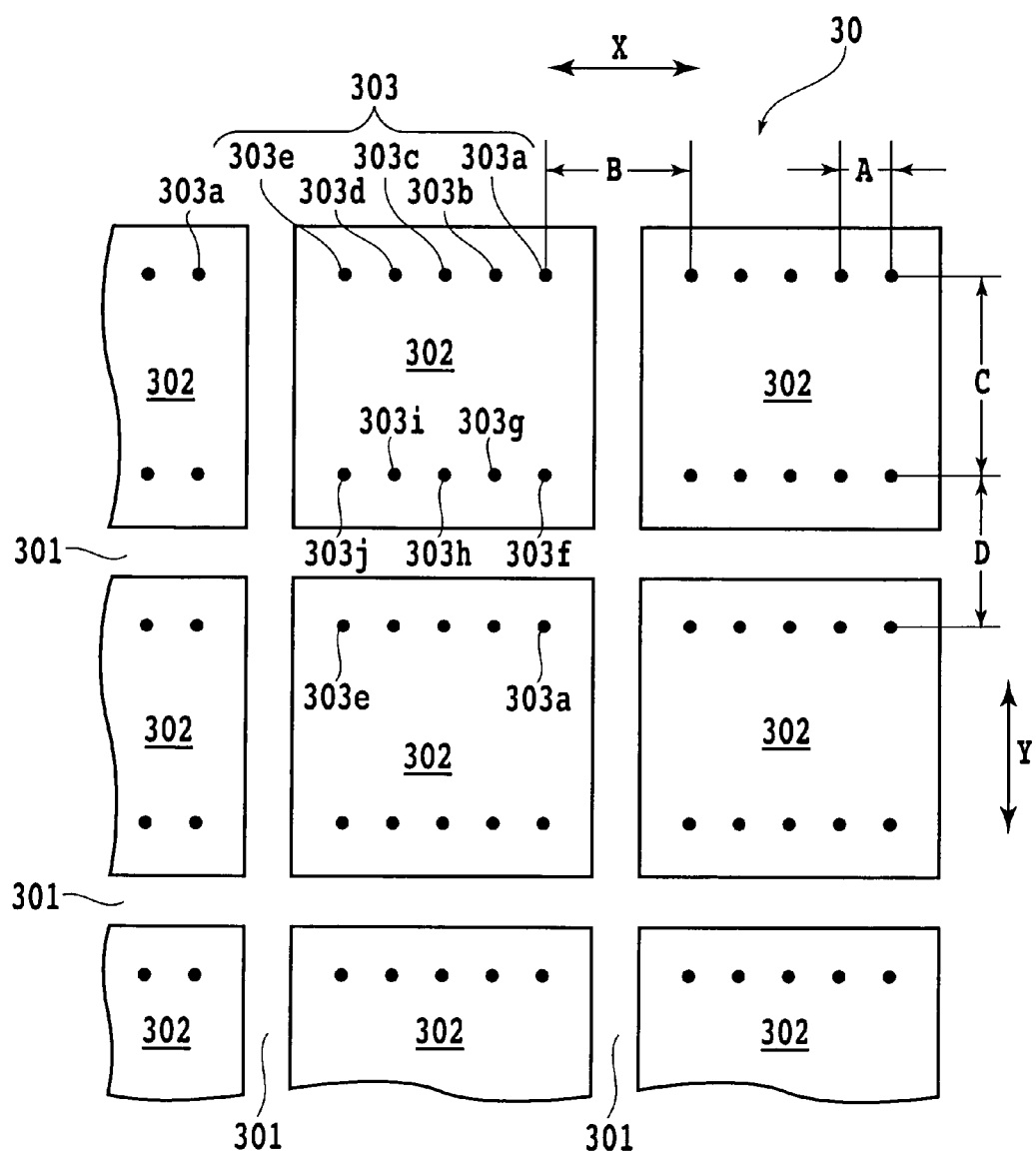
FIG. 5 is a top plan view showing, in an enlarged scale, part of the semiconductor wafer shown in FIG. 4.

Now, a working method of perforating a laser work hole in a work using the laser working machine described above is described. FIG. 4 shows a plan view of a semiconductor wafer 30 as a work to be laser-worked. Referring to FIG. 4, the semiconductor wafer 30 shown is a silicon wafer and has a plurality of regions defined by a plurality of division plan lines 301 disposed in a grid-like fashion on the front face 30a of the semiconductor wafer 30. A device 302 such as an IC or an LSI is formed in each of the defined regions. All of the devices 302 have a same configuration. A plurality of electrodes 303 (303a to 303j) are formed on the surface of each device 302 as seen in FIG. 5. It is to be noted that electrodes 303a and 303f, 303b and 303g, 303c and 303h, 303d and 303i, or 303e and 303j are positioned at the same position in the X direction. At the positions of the electrodes 303 (303a to 303j), working holes (via holes) are formed such that they extend from the rear face 10b of the electrodes 303.

In the arrangement shown in FIG. 5, the distance As between the electrodes 303 (303a to 303j) on each device 302 in the X direction (leftward and rightward direction in FIG. 5) and the distance Bs between adjacent ones of the electrodes 303 formed on the devices 302 across each division plan line 301 in the X direction (leftward and rightward direction in FIG. 5), that is, between the electrode 303e and the electrode 303a, are set equal to each other. Further, in the arrangement shown in FIG. 5, the distance C between the electrodes 303 (303a to 303j) on each device 302 in the Y direction (upward and downward direction in FIG. 5) and the distance C between adjacent ones of the electrodes 303 formed on the devices 302 across each division plan line 301 in the Y direction (upward and downward direction in FIG. 5), that is, between the electrode 303f and the electrode 303a and 303j, are set equal to each other. Data of design values for the number of devices 302 disposed in the rows E1, En and the columns F1, . . . , Fn shown in FIG. 4 and the distances A, B, C, and D of the semiconductor wafer 30 having such a configuration as described above are stored in the first storage region 203a of the random access memory (RAM) 203 described hereinabove.

Figure 6:
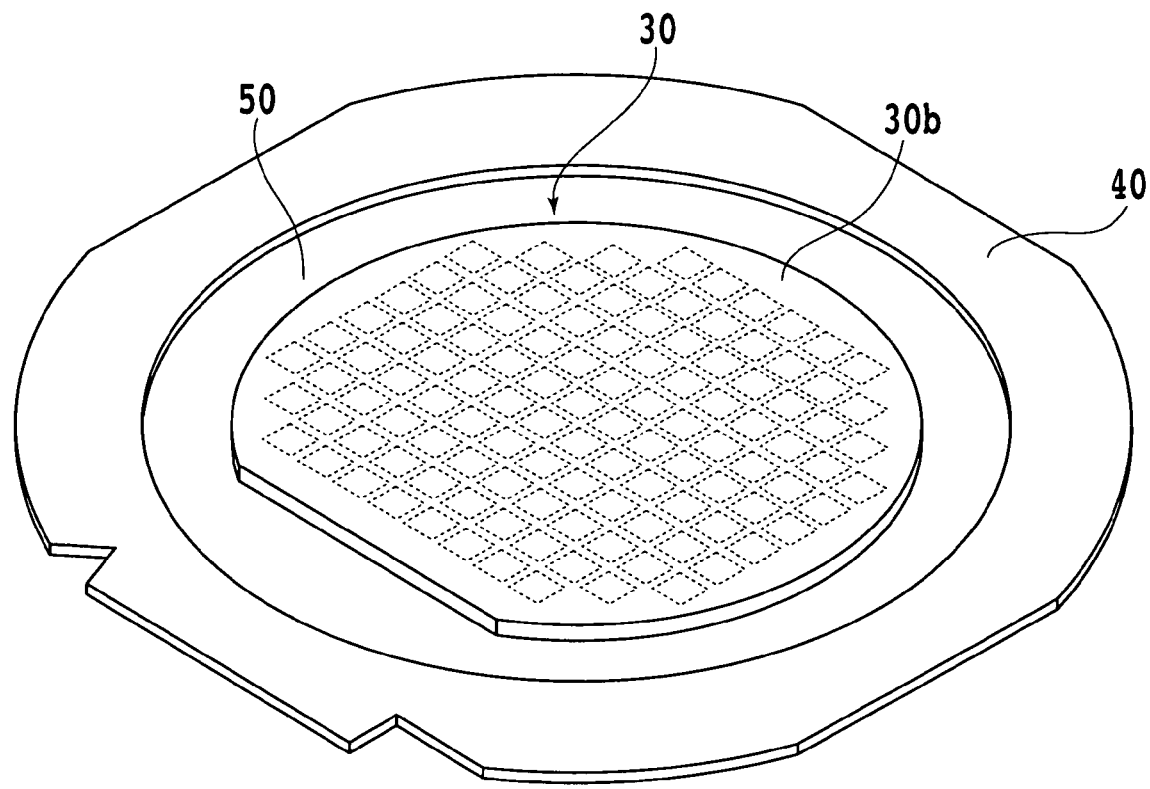
FIG. 6 is a perspective view illustrating a state wherein the semiconductor wafer shown in FIG. 4 is adhered to the surface of a protective tape mounted on an annular frame.

Laser working in which the laser working machine described above is used to form work holes (via holes) at the positions of the electrodes 303 (303a to 303j) of the devices 302 formed on the semiconductor wafer 30 is described. The semiconductor wafer 30 configured in such a manner as described above is adhered, at the surface 30a thereof, to a protective tape 50 formed from a synthetic resin sheet of polyolefin or the like mounted on an annular frame 40 as seen in FIG. 6. Accordingly, the rear face 30b of the semiconductor wafer 30 is directed upwardly. The semiconductor wafer 30 supported on the frame 40 with the protective tape 50 interposed therebetween in this manner is placed, at the protective tape 50 side thereof, on the chuck table 36 of the laser working apparatus shown in FIG. 1. Then, the sucking means not shown is rendered operative to cause the semiconductor wafer 30 to be attracted to and held by the chuck table 36 with the protective tape 50 positioned therebetween. Further, the annular frame 40 is fixed by the clamp 362.

The chuck table 36 to and by which the semiconductor wafer 30 is attracted and held as described hereinabove is positioned immediately below the image pickup means 11 by the working feeding means 37. Where the chuck table 36 is positioned immediately below the image pickup means 11, the semiconductor wafer 30 on the chuck table 36 is positioned at a coordinate position shown in FIG. 7. In this state, an alignment work of detecting whether or not the grid-like division plan lines 301 formed on the semiconductor wafer 30 held on the chuck table 36 are disposed in parallel to each other in both of the X-axis direction and the Y-axis direction.

In particular, an image of the semiconductor wafer 30 held on the chuck table 36 is picked up by the image pickup means 11, and an image process such as pattern matching is executed for the picked up image to perform an alignment work. At this time, while the front face 30a of the semiconductor wafer 30 on which the division plan lines 301 are formed is positioned on the lower side, since the image pickup means 11 includes image pickup means composed of infrared irradiation means, an optical system for catching infrared rays, an image pickup device (infrared CCD), and so forth as described above, an image of the division plan lines 301 can be picked up through the rear face 30b of the semiconductor wafer 30.

Then, the chuck table 36 is moved so that the device 302 at the leftmost end in FIG. 7 in the uppermost row E1 of the devices 302 formed on the semiconductor wafer 30 is positioned immediately below the image pickup means 11. Further, the left upper electrode 303a in FIG. 7 among the electrodes 303 (303a to 303j) formed on the device 302 is positioned immediately below the image pickup means 11. If, in this state, the image pickup means 11 detects the electrode 303a, then the coordinate value (a1) of the electrode 303a is sent as a first working feeding start position coordinate value to the controller 20. The controller 20 stores the coordinate value (a1) as the first working feeding start position coordinate value into the random access memory (RAM) 203 (working feeding start position detection step). At this time, since the image pickup means 11 and the condenser 10 of the laser beam irradiation apparatus 52 are disposed in a predetermined spaced relationship from each other, the sum value of the X coordinate value and the distance between the image pickup means 11 and the condenser 10 is stored.

Figure 7:
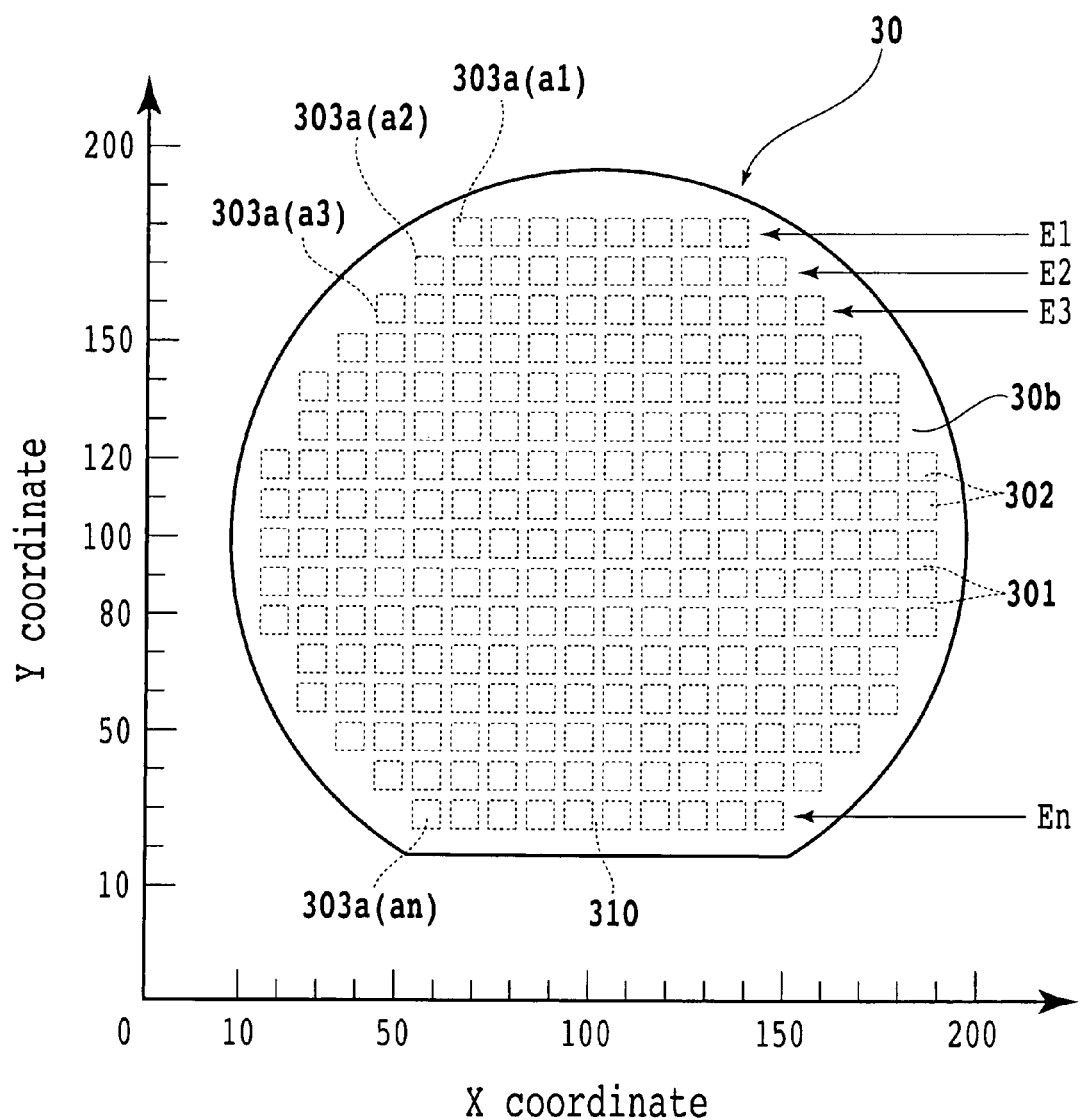
FIG. 7 is a diagrammatic view illustrating a relationship between the semiconductor wafer shown in FIG. 4 and the coordinates in a state wherein the semiconductor wafer is held at a predetermined position of a chuck table of the laser working machine shown in FIG. 1.

After the first working feeding start position coordinate value (a1) of the device 302 in the uppermost row E1 in FIG. 7 is detected in this manner, the chuck table 36 is fed for indexing by the distance between the division plan lines 301 in the Y-axis direction and is moved in the X-axis direction until the left upper electrode 303a in FIG. 7 among the electrodes 303 (electrode 303a to 303j) formed on the devices 302 is positioned immediately below the image pickup means 11. If the electrode 303a is detected by the image pickup means 11 in this state, then the detected coordinate value (a2) is sent as a second working feeding start position coordinate value to the controller 20. The controller 20 stores the coordinate value (a2) as the second working feeding start position coordinate value into the random access memory (RAM) 203.

At this time, since the image pickup means 11 and the condenser 10 of the laser beam irradiation apparatus 52 are disposed in a spaced relationship by a predetermined distance from each other in the X-axis direction as described hereinabove, the sum value of the X coordinate value and the distance between the image pickup means 11 and the condenser 10 is stored. Thereafter, the controller 20 repetitively executes the indexing feeding and the working feeding start position detection step described above up to the lowermost row En at the lowermost position in FIG. 7. Thus, the controller 20 detects the working feeding start position coordinate values (a3 to an) of the devices 302 formed in the rows and stores the detected working feeding start position coordinate values into the random access memory (RAM) 203.

Figure 8A:
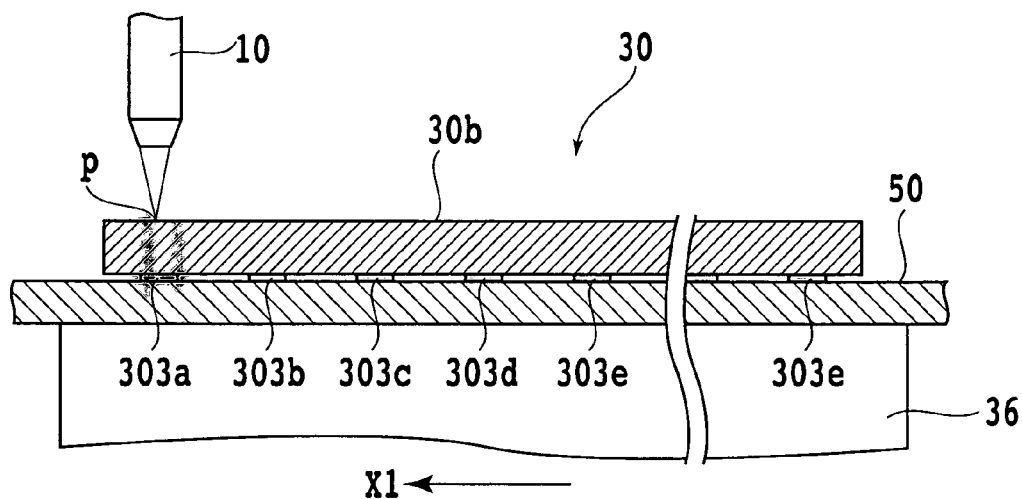
FIGS. 8A and 8B are explanatory views illustrating a perforation step carried out by the laser working machine shown in FIG. 1.

Thereafter, a perforation step of perforating a laser work hole (via hole) at each of the positions the electrodes 303 (303a to 303j) formed on the devices 302 of the semiconductor wafer 30 is carried out. At the perforation step, the working feeding means 37 is rendered operative to move the chuck table 36 until the first working feeding start position coordinate value (a1) stored in the A/D converter 103 is positioned immediately below the condenser 10 of the laser beam irradiation apparatus 52. In FIG. 8A, the first working feeding start position coordinate value (a1) is shown positioned immediately below the condenser 10 in this manner. Then, the controller 20 controls the working feeding means 37 to perform working feeding of the chuck table 36 at a predetermined moving speed in the direction indicated by an arrow mark X1 in FIG. 8A from the position illustrated in FIG. 8A. Simultaneously, the controller 20 renders the laser beam irradiation apparatus 52 operative to cause the condenser 10 to irradiate a pulse laser beam for a predetermined period of time.

It is to be noted that the condensing point P of the laser beam irradiated from the condenser 10 is adjusted near to the surface 30a of the semiconductor wafer 30. At this time, the controller 20 outputs a control signal for controlling the first deflection angle adjustment means 814 and the first output adjustment means 815 of the first acousto-optic detection means 81 to the control means 9 based on a detection signal from the reading head 374b of the working feeding amount detection means 374 within a predetermined of time within which the pulse laser beam is irradiated. In particular, the controller 20 outputs a control signal to the control means 9 so that the driving pulse signal (DS) is outputted within a range from 0 to 10 V to the first deflection angle adjustment means 814 as seen in FIG. 3. It is to be noted that, since the pulse laser beam is not deflected to the Y-axis direction at the perforation step in the embodiment shown in FIG. 1, the controller 20 outputs a control signal to the control means 9 so that the driving pulse signal (DS) for applying a voltage of 5 V to the second deflection angle adjustment means 824 of the second acousto-optic deflection means 82 is outputted.

Meanwhile, the first RF oscillator 812 outputs a RF corresponding to the control signals from the first deflection angle adjustment means 814 and the first output adjustment means 815. The power of the RF outputted from the first RF oscillator 812 is amplified by the first RF amplifier 813 and applied to the first acousto-optic device 811. Also the second RF oscillator 822 outputs a RF corresponding to the control signals from the second deflection angle adjustment means 824 and the second output adjustment means 825. The power of the RF outputted from the second RF oscillator 822 is amplified by the second RF amplifier 823 and applied to the second acousto-optic device 821. As a result, the first acousto-optic device 811 and the second acousto-optic device 821 deflect the pulse laser beam oscillated from the pulse laser beam oscillation means 6 within a range from a position indicated by an alternate long and short dash line to an alternate long and two short dashes line in FIG. 2.

An example of working conditions at the perforation step is given below.

| | |
|---|---|
| Light source: | LD excited Q switch Nd: YV04 |
| Wavelength: | 355 nm |
| Cycle frequency: | 10 kHz |
| Average output power: | 5 W |
| Condensed spot diameter: | φ15 μm |
| Working feeding speed: | 50 mm/sec |

If the perforation step is carried out in the conditions specified above, then a laser work hole of approximately 5 μm in depth can be formed per one pulse of the laser beam on the silicon wafer. Accordingly, in order to form a work hole which extends to an electrode 303 in the silicon wafer of 50 μm thick, it is necessary to irradiate the pulse laser beam for a period of time corresponding to 10 pulses. Therefore, a work hole extending up to an electrode 303 can be formed by irradiating the pulse laser beam by 10 pulses at the first working feeding start position coordinate value (a1) of the semiconductor wafer 30 held on the chuck table 36 which is moving at the working feeding speed of 300 mm/sec in the conditions specified above.

Figure 9A:
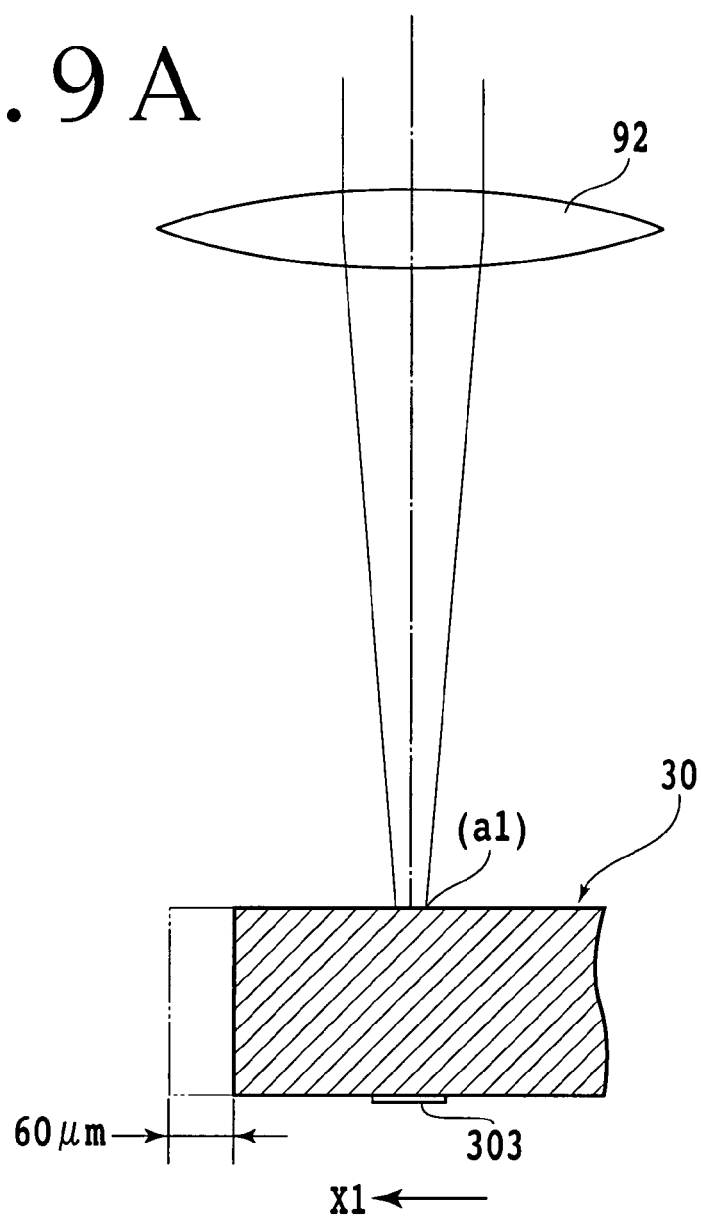
FIGS. 9A and 9B are explanatory views illustrating, in an enlarged scale, details of the perforation step illustrated in FIGS. 8A and 8B.

Here, a method of irradiating a pulse laser beam of 10 pulses on the first working feeding start position coordinate value (a1) of the semiconductor wafer 30 while the semiconductor wafer 30 is moving at a working feeding speed of 50 mm/second is described with reference to FIG. 9. Since the cycle frequency of the pulse laser beam is 10 kHz in the working conditions given hereinabove, the pulse laser beam of 10,000 pulses (that is, one pulse per 100,000 ns) is irradiated for one second. Accordingly, the time necessary to irradiate the pulse laser beam of 10 pulses is 1/1000 second. On the other hand, the semiconductor wafer 30 which is moving in the direction indicated by X1 at the working feeding speed of 50 mm/second moves by 50 μm for 1/1000 second. Accordingly, the driving pulse signal (DS) to be applied to the first deflection angle adjustment means 814 and the first output adjustment means 815 of the first acousto-optic deflection means 81 and the second deflection angle adjustment means 824 and the second output adjustment means 825 of the second acousto-optic deflection means 82 should be controlled so that the laser beam irradiation means 52 is operated for 1/1000 second while the semiconductor wafer 30 moves by 50 μm and the condensing point of the pulse laser beam is positioned at the first working feeding start position coordinate value (a1).

Figure 9B:
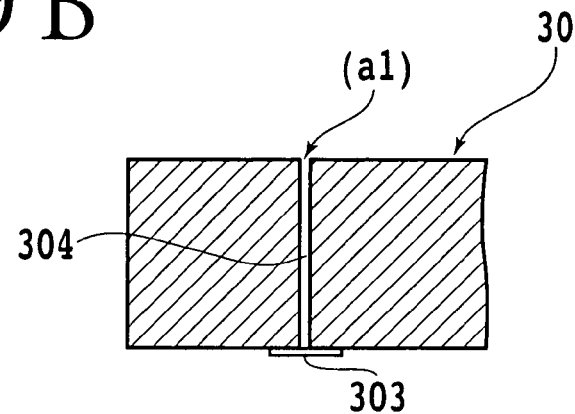

In particular, based on a detection signal from the reading head 374b of the working feeding amount detection means 374 sent from the controller 20, the control means 9 controls the driving pulse signal (DS) of the voltage to be applied, for 430 ns, as seen in FIG. 3, to the first deflection angle adjustment means 814 and the first output adjustment means 815 of the first acousto-optic deflection means 81 and the second deflection angle adjustment means 824 and the second output adjustment means 825 of the second deflection angle adjustment means 82 as described above and controls the frequency of the RF power to be applied to the first acousto-optic device 811 of the first acousto-optic deflection means 81 and the second acousto-optic device 821 of the second acousto-optic deflection means 82. Consequently, the pulse laser beam irradiation method described above can be carried out. As a result, since the pulse laser beam of 10 pulses can be irradiated on the first working feeding start position coordinate value (a1) also in a state wherein the semiconductor wafer 30 is moving in the working feeding direction X1, a laser working hole 304 which extends up to the electrode 303 is formed at the first working feeding start position coordinate value (a1) of the semiconductor wafer 30 as shown in FIG. 9B.

After the pulse laser beam of 10 pulses is irradiated on the first working feeding start position coordinate value (a1) in this manner, the controller 20 outputs a control signal to the control means 9 so that the driving pulse signal (DS) for applying a voltage of 15 V to the first deflection angle adjustment means 814 of the first acousto-optic deflection means 81 for 430 ns is outputted every time the laser beam by one pulse is outputted. As a result, a RF having a frequency corresponding to 15 V is applied to the first acousto-optic device 811, and the pulse laser beam (LB) oscillated from the pulse laser beam oscillation means 6 is guided to the laser beam absorption means 83 as indicated by a broken line in FIG. 2.

It is to be noted that, since the laser beam (LB) is not changed to the indexing feeding direction (Y-axis direction) orthogonal to the working feeding direction (X-axis direction) in the embodiment shown in FIG. 1, a voltage of 5 V is applied from the driving circuit 91 to the second deflection angle adjustment means 825 of the second acousto-optic deflection means 82 for 430 ns every time the laser beam by one pulse is outputted. The timing at which the voltage of 5 V is to be applied to the second deflection angle adjustment means 825 is same as the timing at which the control voltage is applied to the first deflection angle adjustment means 814 of the first acousto-optic deflection means 81 for 430 ns every time the laser beam by one pulse is outputted.

Since the time for driving the first and second acousto-optic deflection means 81 and 82 in such a manner as described above is set to 0.43% with respect to the irradiation time of the pulse laser beam (LB) as described above, the time for which the RF is to be applied to the first and second acousto-optic devices 811 and 821 with respect to the irradiation time of the pulse laser beam (LB) may be very short, and therefore, thermal distortion which may appear on the first and second acousto-optic devices 811 and 821 is suppressed.

Figure 8B:
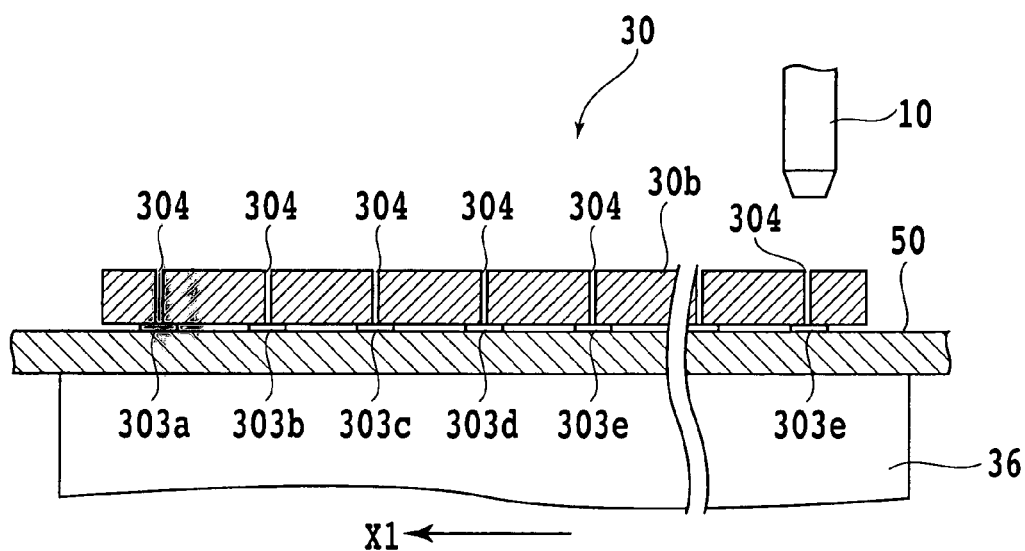

On the other hand, the controller 20 receives a detection signal from the reading head 374b of the working feeding amount detection means 374 as an input thereto and counts the detection signal using the counter 204. Then, if the count value by the counter 204 reaches a value corresponding to the distance A in the X-axis direction in FIG. 5 between the electrodes 303, then the controller 20 controls the laser beam irradiation means 52 to perform the perforation step. Also thereafter, the controller 20 controls the laser beam irradiation section 52 to operate to perform the perforation step every time the count value by the counter 204 reaches a value of the distance A or B in the X-axis direction in FIG. 5 between the electrodes 203. Then, if the perforation step is performed at the electrode 303e position at the rightmost end in FIG. 7 among the electrodes 303 formed on the device 302 at the rightmost end of the E1th row of the semiconductor wafer 30 as seen in FIG. 8B, then the operation of the working feeding means 37 is stopped to stop the movement of the chuck table 36. As a result, a laser working hole 304 is formed at a portion of each of the electrodes 303 (not shown) as seen in FIG. 8B.

Then, the controller 20 controls the first indexing feeding means 38 so that the condenser 10 of the laser beam irradiation means 52 is fed for indexing in a direction perpendicular to the plane of FIG. 8B. On the other hand, the controller 20 receives a detection signal from the reading head 433b of the indexing feeding amount detection means 433 as an input thereto and counts the detection signal using the counter 204. Then, if the count value by the counter 204 reaches a value corresponding to the distance C in the Y-axis direction in FIG. 5 between the electrodes 303, then the operation of the first indexing feeding means 38 is stopped to stop the indexing feeding operation of the condenser 10 of the laser beam irradiation means 52. As a result, the condenser 10 is adjusted to a position just above the electrode 303j (refer to FIG. 5) opposing to the electrode 303e. This state just described is a state shown in FIG. 10A.

Figure 10A:
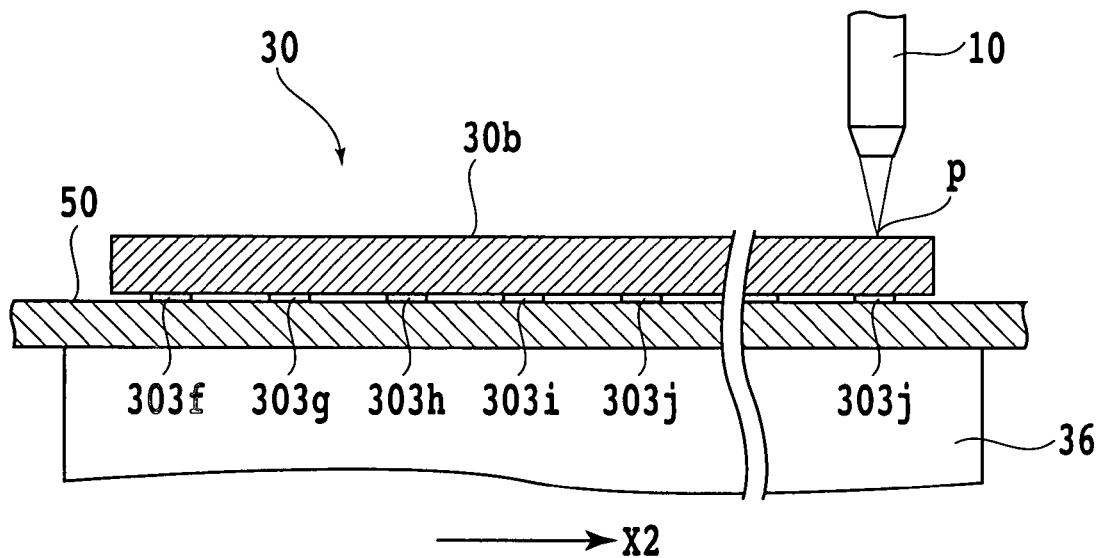
FIGS. 10A and 10B are explanatory views illustrating another perforation step carried out by the laser working machine shown in FIG. 1.
Figure 10B:
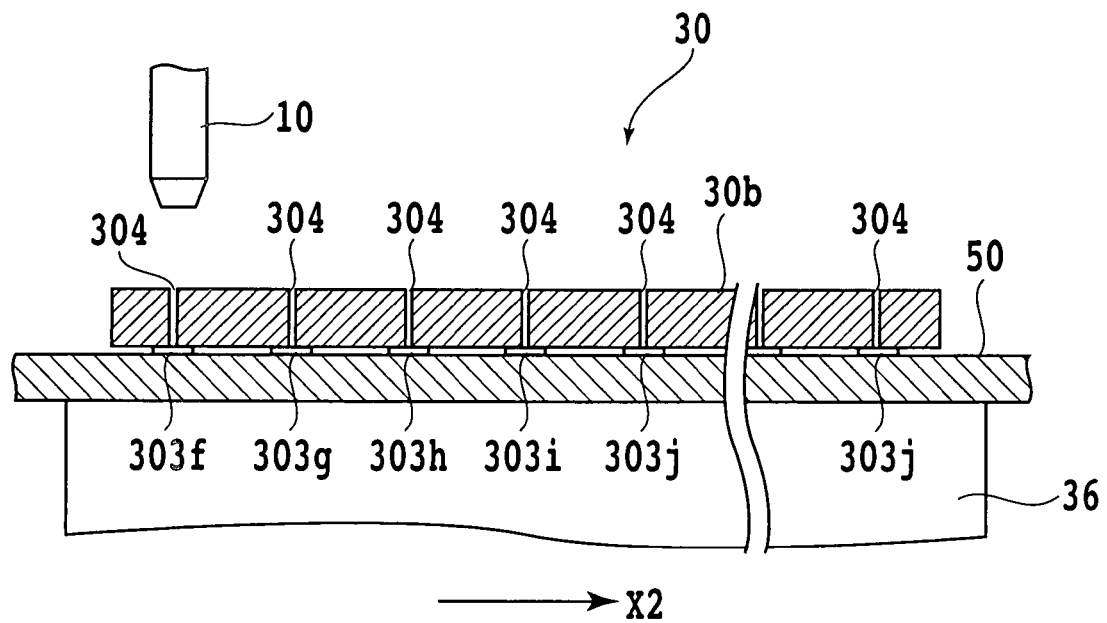

In the state illustrated in FIG. 10A, the controller 20 operates the laser beam irradiation means 52 to perform the perforation step while the working feeding means 37 is controlled so that the chuck table 36 is fed for working at a predetermined moving speed in the direction indicated by an arrow mark X2 in FIG. 10A. Then, the controller 20 counts a detection signal from the reading head 374b of the working feeding amount detection means 374 using the counter 204 as described above. Then, the controller 20 operates the laser beam irradiation means 52 to perform the perforation step every time the count value of the detection signal reaches the value of the distance A or B in the X-axis direction in FIG. 5 between the electrodes 303. Then, if the perforation step is performed at the electrode 303f position formed on the device 302 at the rightmost end on the E1 row of the semiconductor wafer 30 as seen in FIG. 10B, then the operation of the working feeding means 37 is stopped to stop the movement of the chuck table 36. As a result, a laser working hole 304 is formed at each electrode 303 (not shown) portion as seen in FIG. 10B.

After the laser working holes 304 are formed at the electrode 303 portions formed on the devices 302 on the E1 row of the semiconductor wafer 30 as described above, the controller 20 operates the working feeding means 37 and the first indexing feeding means 38 so that the second working feeding starting position coordinate value (a2), which is stored in the random access memory (RAM) 203, of the electrode 303 formed on the device 302 on the E2 row of the semiconductor wafer 30 is adjusted to a position just under the condenser 10 of the laser beam irradiation means 52. Then, the controller 20 controls the laser beam irradiation means 52, working feeding means 37 and first indexing feeding means 38 to carry out the perforation step for electrode 303 portions formed on the devices 302 on the E2 row of the semiconductor wafer 30. Thereafter, the perforation step is performed also for the electrode 303 portions formed on the devices 302 on the E3 to En rows of the semiconductor wafer 30. As a result, a laser working hole 304 is formed at all of the electrode 303 portions formed on the devices 302 on the semiconductor wafer 30.

It is to be noted that, at the perforation step, the pulse laser beam is not irradiated on the semiconductor wafer 30 in the distance A regions and the distance B regions in the X-axis direction in FIG. 5. In order that the pulse laser beam is not irradiated on the semiconductor wafer 30 in this manner, the controller 20 outputs a control signal to the control means 9 so that the driving pulse signal (DS) for applying the voltage of 15 V to the first deflection angle adjustment means 814 of the first acousto-optic deflection means 81 is outputted. As a result, since a RF having a frequency corresponding to 15 V is applied to the first acousto-optic device 811 and the pulse laser beam (LB) oscillated from the pulse laser beam oscillation means 6 is guided to the laser beam absorption means 83 as indicated by a broken line in FIG. 2, the pulse laser beam is not irradiated on the semiconductor wafer 30. It is to be noted that, at this time, the voltage of 5 V is applied to the second deflection angle adjustment means 825 of the second acousto-optic deflection means 82.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser beam irradiation apparatus, comprising:

laser beam oscillation means including a pulse laser beam oscillator configured to oscillate a pulse laser beam and a cycle frequency setting means for setting the cycle frequency of the pulse laser beam to be oscillated from said pulse laser beam oscillator;

first acousto-optic deflection means including a first acousto-optic device configured to deflect the pulse laser beam oscillated from said laser beam oscillation means, a first RF oscillator configured to apply a RF to said first acousto-optic device, a first RF amplifier configured to amplify the RF generated by the first RF oscillator, a first deflection angle adjustment means for adjusting the frequency of the RF to be outputted from said first RF oscillator and a first output adjustment means for adjusting the amplitude of the RF to be generated by said first RF oscillator;

second acousto-optic deflection means including a second acousto-optic device configured to deflect the pulse laser beam oscillated from said laser beam oscillation means, a second RF oscillator configured to apply a RF to said second acousto-optic device, a second RF amplifier configured to amplify the RF generated by the second RF oscillator, a second deflection angle adjustment means for adjusting the frequency of the RF to be outputted from said second RF oscillator and a second output adjustment means for adjusting the amplitude of the RF to be generated by said second RF oscillator;

control means, including a computer, for controlling said first and second deflection angle adjustment means and said first and second output adjustment means by outputting a driving pulse signal having a predetermined time, including a pulse width of the pulse laser beam oscillated from said pulse laser beam oscillator, to said first and second deflection angle adjustment means and said first and second output adjustment means based on a cycle frequency setting signal from said cycle frequency setting means, wherein a driving pulse of said driving pulse signal starts at a time before a laser beam pulse starts and said driving pulse ends after said laser beam pulse ends, but before a subsequent laser beam pulse starts; and a condenser configured to condense the laser beam deflected by said first and second acousto-optic deflection means, wherein said cycle frequency setting means includes an excitation trigger transmitter configured to output an excitation trigger to said pulse laser beam oscillator and an oscillation trigger transmitter configured to output an oscillation trigger to said pulse laser beam oscillator, and said control means sets a timing at which the driving pulse signal is to be outputted with reference to the excitation trigger outputted from said excitation trigger transmitter, wherein said driving pulse signal outputted to said first and second deflection angle adjustment means and said first and second output adjustment means starts after the excitation trigger is outputted from said excitation trigger transmitter but before the oscillation trigger is outputted from said oscillation trigger transmitter, wherein said first and second acousto-optic deflection means deflect the laser beam oscillated from said laser beam oscillation means in directions orthogonal to each other, and wherein said control means controls said first and second deflection angle adjustment means such that a condensing point of the laser beam is maintained at a specified position on a work, for a specified period of time, even though a chuck table, with the work thereon, is moving in a working feeding direction relative to the laser beam oscillation means.

2. A laser working machine, comprising:

a chuck table configured to hold a work;

laser beam irradiation means for irradiating a laser beam on the work held by said chuck table;

working feeding means for relatively moving said chuck table and said laser beam irradiation means in a working feeding direction; and indexing feeding means for relatively moving said chuck table and said laser beam irradiation means in an indexing feeding direction orthogonal to the working feeding direction;

said laser beam irradiation means including:

laser beam oscillation means including a pulse laser beam oscillator configured to oscillate a pulse laser beam and a cycle frequency setting means for setting the cycle frequency of the pulse laser beam to be oscillated from said pulse laser beam oscillator;

first acousto-optic deflection means including a first acousto-optic device configured to deflect the pulse laser beam oscillated from said laser beam oscillation means, a first RF oscillator configured to apply a RF to said first acousto-optic device, a first RF amplifier configured to amplify the RF generated by the first RF oscillator, a first deflection angle adjustment means for adjusting the frequency of the RF to be outputted from said first RF oscillator and a first output adjustment means for adjusting the amplitude of the RF to be generated by said first RF oscillator;

second acousto-optic deflection means including a second acousto-optic device configured to deflect the pulse laser beam oscillated from said laser beam oscillation means, a second RF oscillator configured to apply a RF to said second acousto-optic device, a second RF amplifier configured to amplify the RF generated by the second RF oscillator, a second deflection angle adjustment means for adjusting the frequency of the RF to be outputted from said second RF oscillator and a second output adjustment means for adjusting the amplitude of the RF to be generated by said second RF oscillator;

control means, including a computer, for controlling said first and second deflection angle adjustment means and said first and second output adjustment means by outputting a driving pulse signal having a predetermined time, including a pulse width of the pulse laser beam oscillated from said pulse laser beam oscillator, to said first and second deflection angle adjustment means and said first and second output adjustment means based on a cycle frequency setting signal from said cycle frequency setting means, wherein a driving pulse of said driving pulse signal starts at a time before a laser beam pulse starts and said driving pulse ends after said laser beam pulse ends, but before a subsequent laser beam pulse starts; and a condenser configured to condense the laser beam deflected by said first and second acousto-optic deflection means, wherein said cycle frequency setting means includes an excitation trigger transmitter configured to output an excitation trigger to said pulse laser beam oscillator and an oscillation trigger transmitter configured to output an oscillation trigger to said pulse laser beam oscillator, and said control means sets a timing at which the driving pulse signal is to be outputted with reference to the excitation trigger outputted from said excitation trigger transmitter, wherein said driving pulse signal outputted to said first and second deflection angle adjustment means and said first and second output adjustment means starts after the excitation trigger is outputted from said excitation trigger transmitter but before the oscillation trigger is outputted from said oscillation trigger transmitter, wherein said first and second acousto-optic deflection means deflect the laser beam oscillated from said laser beam oscillation means in directions orthogonal to each other, and wherein said control means controls said first and second deflection angle adjustment means such that a condensing point of the laser beam is maintained at a specified position on the work, for a specified period of time, even though said chuck table, with the work thereon, is moving in the working feeding direction relative to the laser beam irradiation means.

3. A laser working machine, comprising:

a chuck table configured to hold a work;

laser beam irradiation means for irradiating a laser beam on the work held by said chuck table;

working feeding means for relatively moving said chuck table and said laser beam irradiation means in a working feeding direction; and indexing feeding means for relatively moving said chuck table and said laser beam irradiation means in an indexing feeding direction orthogonal to the working feeding direction;

said laser beam irradiation means including:

laser beam oscillation means including a pulse laser beam oscillator configured to oscillate a pulse laser beam and a cycle frequency setting means for setting the cycle frequency of the pulse laser beam to be oscillated from said pulse laser beam oscillator;

first acousto-optic deflection means including a first acousto-optic device configured to deflect the pulse laser beam oscillated from said laser beam oscillation means, a first RF oscillator configured to apply a RF to said first acousto-optic device, a first RF amplifier configured to amplify the RF generated by the first RF oscillator, a first deflection angle adjustment means for adjusting the frequency of the RF to be outputted from said first RF oscillator and a first output adjustment means for adjusting the amplitude of the RF to be generated by said first RF oscillator;

second acousto-optic deflection means including a second acousto-optic device configured to deflect the pulse laser beam oscillated from said laser beam oscillation means, a second RF oscillator configured to apply a RF to said second acousto-optic device, a second RF amplifier configured to amplify the RF generated by the second RF oscillator, a second deflection angle adjustment means for adjusting the frequency of the RF to be outputted from said second RF oscillator and a second output adjustment means for adjusting the amplitude of the RF to be generated by said second RF oscillator;

control means, including a computer, for controlling said first and second deflection angle adjustment means and said first and second output adjustment means by outputting a driving pulse signal having a predetermined time, including a pulse width of the pulse laser beam oscillated from said pulse laser beam oscillator, to said first and second deflection angle adjustment means and said first and second output adjustment means based on a cycle frequency setting signal from said cycle frequency setting means; and a condenser configured to condense the laser beam deflected by said first and second acousto-optic deflection means;

wherein said control means controls said first and second deflection angle adjustment means such that a condensing point of the laser beam is maintained at a specified position on the work, for a specified period of time, eventhough said chuck table, with the work thereon, is moving in the working feeding direction relative to the laser beam irradiation means, wherein said cycle frequency setting means includes an excitation trigger transmitter configured to output an excitation trigger to said pulse laser beam oscillator and an oscillation trigger transmitter configured to output an oscillation trigger to said pulse laser beam oscillator, and said control means sets a timing at which the driving pulse signal is to be outputted with reference to the excitation trigger outputted from said excitation trigger transmitter, wherein said driving pulse signal outputted to said first and second deflection angle adjustment means and said first and second output adjustment means starts after the excitation trigger is outputted from said excitation trigger transmitter but before the oscillation trigger is outputted from said oscillation trigger transmitter, and wherein said first and second acousto-optic deflection means deflects the laser beam oscillated from said laser beam oscillation means in directions orthogonal to each other.

* * * * *